United States Patent
Wattignier et al.

[11] Patent Number: 5,918,857
[45] Date of Patent: Jul. 6, 1999

[54] PACKING FOR THE AXIS OF A CLACK VALVE

[75] Inventors: Claude Wattignier, Talence; Jean-Paul Dubois, Contras, both of France

[73] Assignee: KSB Aktiengesellschaft, Frankenthal, Germany

[21] Appl. No.: 08/647,280

[22] Filed: May 13, 1996

Related U.S. Application Data

[63] Continuation of application No. 08/325,368, filed as application No. PCT/EP93/00944, Apr. 20, 1993, abandoned.

[30] Foreign Application Priority Data

Apr. 24, 1992 [DE] Germany ............................ 42 13 522

[51] Int. Cl.⁶ ....................................................... F16K 1/22
[52] U.S. Cl. ............................................ 251/305; 251/306
[58] Field of Search ...................................... 251/305, 306

[56] References Cited

U.S. PATENT DOCUMENTS

| 3,024,802 | 3/1962 | Stillwagon | 251/306 X |
| 3,072,139 | 1/1963 | Mosites | 251/306 X |
| 3,647,180 | 3/1972 | Church | 251/306 |
| 4,133,513 | 1/1979 | Meyer | 251/306 |

FOREIGN PATENT DOCUMENTS

| A2 069 639 | 9/1971 | France . |
| A1 475 972 | 4/1969 | Germany . |
| A 26 08 161 | 2/1976 | Germany . |
| A 28 43 833 | 10/1978 | Germany . |
| A 28 46 439 | 10/1978 | Germany . |
| A3 203 374 | 8/1983 | Germany . |

*Primary Examiner*—John Fox
*Attorney, Agent, or Firm*—Darby & Darby

[57] ABSTRACT

A clack valve includes a housing having a circumferential groove. A rotatable valve disk is disposed within the housing. A gap of constant width at any axial cross-section through the disk is defined between the valve disk and the circumferential groove of the housing. A valve shaft passes from the rotatable valve disk into the housing. An elastic sealing cup has a passage opening for the valve shaft. The elastic sealing cup is disposed between the circumferential groove of the housing and the valve disk to seal the valve disk and the valve shaft against the housing. The elastic sealing cup has a curved circumferential flange to engage the circumferential groove. The curved circumferential flange has a material accumulation in a region of the passage opening. The material accumulation is created by an increase of a thickness of the curved circumferential flange to a maximum thickness in the region of the passage opening for the valve shaft.

2 Claims, 2 Drawing Sheets

PACKING FOR THE AXIS OF A CLACK VALVE

This is a continuation of application Ser. No. 08/325,368, filed Oct. 24, 1994, abandoned, which is a 371 of PCT/EP93/00944 filed Apr. 20, 1993.

A clack valve with an elastic sealing cup to block the flow through a line system is a well-known product in the technology. Models have been produced in a large number of nominal widths and in large quantities.

What the user expects from such a clack valve is that it will reliably block the through-flow of a transport medium, due to the great tightness and low leakage rate of the valve disk, as well as absolute tightness of the interior space relative to the environment, both at the connecting flanges and at the passage of the valve axis to activate the clack valve.

Clack valves produced in large quantities generally are robust, easy to manufacture, and economical in cost. They are distinguished by a sealing cup with a very simple design, which is flat and axially symmetric, and which only has two cylindrical openings to allow the valve axis to pass through. However, this design has the disadvantage that the sealing effect at the valve axis is insufficient so that the transport medium penetrates into the housing or wets the valve axis. This can cause major damage.

Various solutions have been proposed to eliminate this disadvantage. The DE-A-2 843 833 shows a combination of two features, both of which increase tightness. The first feature is the formation of corrugations at the sealing surface of the valve axis. On the one hand, this improves the contact of the elastic material of the sealing cup, and on the other hand several chambers are thus formed which decrease or increase the pressure relative to the ambient pressure in the housing and prevent the transport medium from exiting. The second feature is that the formation of a collar consisting of an elastic material improves the seal of the valve axis relative to the valve disk, by the deformation of the collar causing an increase of pressure at the sealing surface.

Another known solution to prevent a lack of tightness consists in reinforcing the passage openings of the valve axis with metal inserts embedded in the sealing cup. These cause the elastic material of the sealing cup to be held fast and to be supported in place. A uniform pressure is thus exerted against the sealing surface. Additional sealing elements can also be used, as disclosed in the DE-C-2 608 161 and the DE-A-2 846 439.

The above design possibilities do indeed achieve an increase of tightness, but the production of the specially designed sealing cup or the subsequent finishing of the housing require additional expenditure. Because of the additional more complicated design features, these clack valves are more expensive than the simple basic model. Especially in mass production, manufacturing costs have a major effect on the competitiveness of a clack valve.

A problem to be solved by the invention is that the simple design allows the sealing effect in the region of the valve axis to decline through the displacement of the elastic material of the sealing cup, while designs which preserve tightness over a more extended period have a complicated design.

It is therefore an object of the invention to create a clack valve with an elastic sealing cup, which is sufficiently tight in the region of the valve axis, and which has a structurally simple design.

The problem is solved by the teaching specified in claim 1.

The advantages which the invention achieves in particular are the following: Using neither complicated bulging profiles nor sealing cups reinforced with inserts, tightness is improved by easily applicable design modifications of the basic type. The local excess of elastic material of the flange of the sealing cup causes the contact pressure in the area of the passage opening of the valve axis to increase when the flange is squeezed together between the housing and the valve disk. The constant increase of the thickness of the flange, when it is in its installed condition, causes a constant rise of the pressure in the flange and prevents local stress peaks. The resulting pressure increase in the sealing cup is maintained over time in the region of the valve axis, since the support of the flange at the side surfaces of the groove of the housing prevents its displacement. The support effect is especially enhanced by the side surfaces of the flange contacting the side surfaces of the groove of the housing without play, also by the passage opening having a diameter that is smaller than that of the valve axis. All these measures, by themselves and in combination, cause a pressure increase in the sealing cup in the region of the valve axis, but only when the valve disk and the valve axis are assembled.

The valve axis is sealed with a greater compression of the sealing cup than is found in the basic type, regardless of the position of the valve disk. In this way, beginning at the maximum permissible pressure in the line system, a complete seal of the housing against the transport medium is assured for a long time.

Advantageous developments of the invention are specified in claims 2 and 3. The development of claim 2 creates a bias tension in the circumferential direction in the sealing cup when it is inserted into the housing, thus increasing the pressure on the entire sealing cup. This also prevents the stressed elastic material from escaping in the circumferential direction, in the region of the valve axis, and it maintains the pressure increase over a longer period of time. In addition, the excess length provides a non-positive connection of the sealing cup to the housing, which secures it against axial displacement.

The development of claim 3 discloses the favorable range of length ratios, within which especially good results can be achieved for the mounting, operation, abrasion and activation forces, and tightness of the sealing cup.

An embodiment of the invention in accordance with claims 1 through 3 is shown in the drawings and will be described in more detail below.

Figure 1:
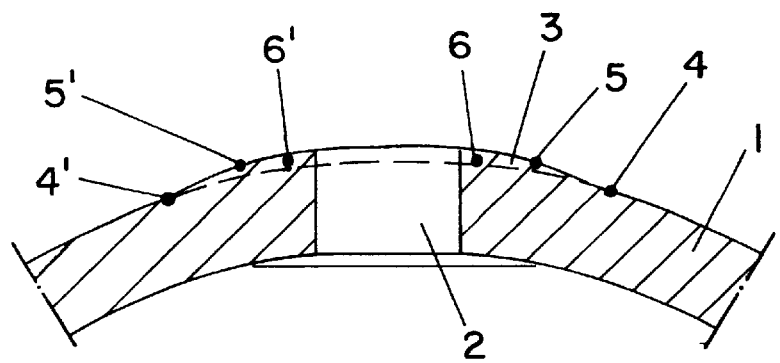
FIG. 1 shows a cross-section through the sealing cup along the line 1—1 in FIG. 2.

The sealing cup (1) has a circumferential flange (14) which engages a circumferential groove (13) in the housing (8). It is thus prevented from being displaced in the axial direction. The flange (14) of the sealing cup (1) has a material accumulation (3) at the passage openings (2). The material accumulation (3) is created by a constant, local increase of the thickness of the flange (14) of the sealing cup (1) from the points (4, 4') to (5, 5'), and by a region of maximal thickness (6, 6') in the vicinity of the passage opening (2).

The embodiment shows the transition from a smaller circumference with points (4, 4') to a larger, concentric circumference with points (5, 5').

Figure 2:
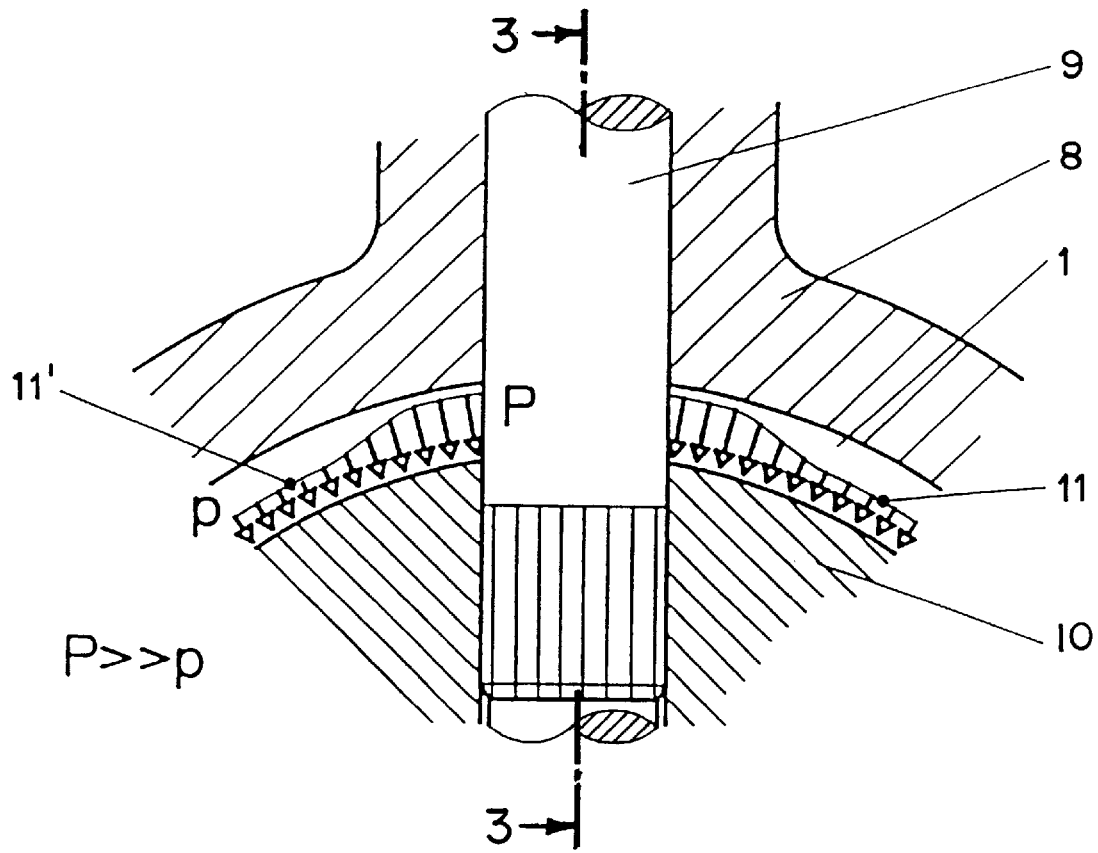
FIG. 2 shows a concentric arrangement of the valve axis in the housing bore with the resulting pressure distribution in the sealing cup and at the valve axis, in cross-section with the valve closed.
Figure 3:
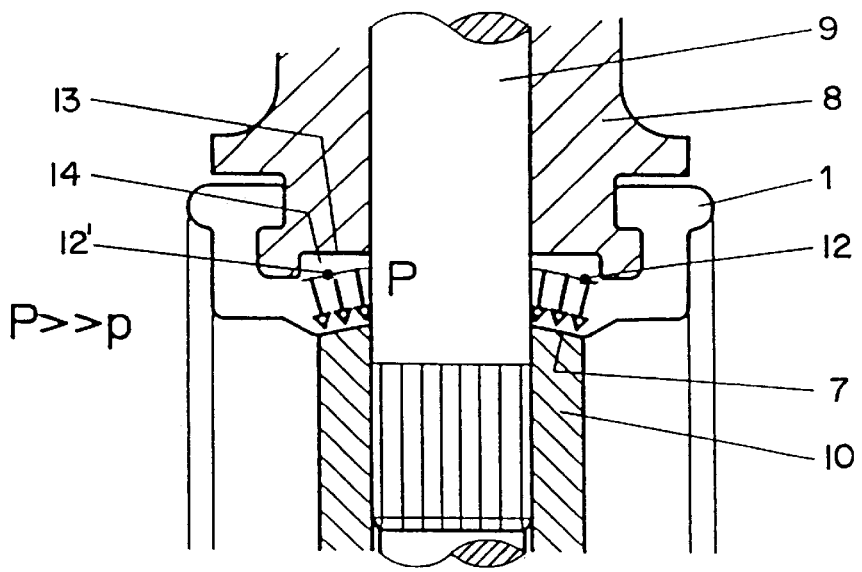
FIG. 3 shows a closed valve in section along the line 3—3 in FIG. 2.

FIGS. 2 and 3 show the installed sealing cup (1) in more detail. The valve disk (10), rotatable about the valve axis (9), is situated in the housing (8). The valve axis (9) is non-rotatably connected to the valve disk (10). The material accumulation (3) is displaced when the valve disk is mounted, so that the housing and the valve disk are concentric. After assembly the sealing cup (1) has the sketched pressure distribution (11, 11') in the circumferential direction. The pressure in the sealing cup (1) here increases constantly from p to P and reaches its maximum in the neighborhood of the valve axis (9).

At the inner circumference of the sealing cup (1), the bulge (7) with its surface in the form of a spherical cup is formed about the opening for the valve axis (9), as is shown in FIG. 3. The valve disk (10) has a corresponding spherical surface in the region of the valve axis, and, together with the bulge (7), forms a spherical sealing surface.

Figure 4:
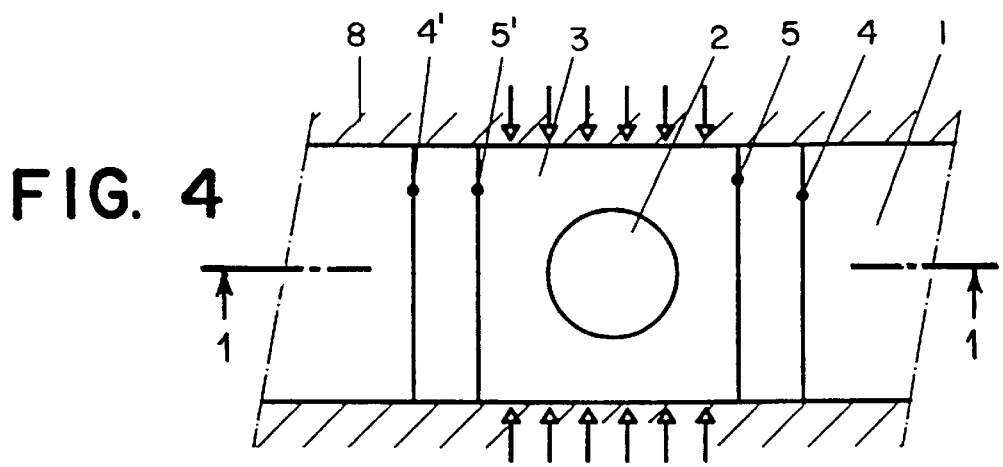
FIG. 4 shows a schematic top view of the sealing cup in its installed condition, with the distribution of its pressure against the housing.

The material accumulation (3) is constant over the entire width of the flange (14) of the sealing cup (1) and extends in the circumferential direction over twice the diameter of the valve axis. This results in a uniform pressure distribution (12, 12') for a long period of time, shown by the arrows in FIG. 4. But it is also possible to vary the material accumulation over the width of the flange. An accumulation only in the middle has the advantage that the valve disk can push into the sealing cup more easily. Inversely, an accumulation at the edge results in an increase of the support effect.

Figure 5:
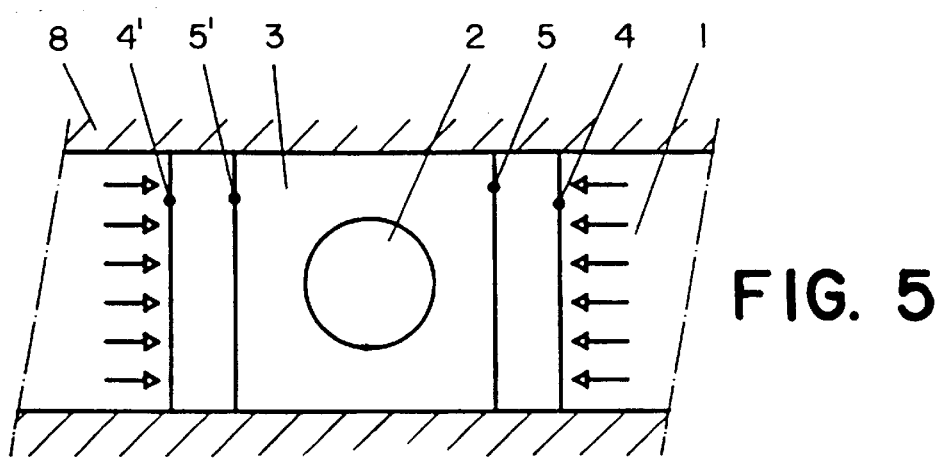
FIG. 5 is a representation like FIG. 4, but where the distribution of the pressure in the circumferential direction is shown schematically.

If the sealing cup is also extended relative to the housing, as described in claims 2 and 3, a bias tension also results in the circumferential direction. This is shown in FIG. 5.

We claim:

1. A clack valve comprising:

a housing having a circumferential groove;

a rotatable valve disk disposed within said housing, a gap of constant width at any axial cross-section through said disk being defined between said valve disk and said circumferential groove of said housing;

a valve shaft passing from the rotatable valve disk into the housing;

an elastic sealing cup having a passage opening for the valve shaft, said elastic sealing cup being disposed between the circumferential groove of said housing and said valve disk to seal the valve disk and the valve shaft against the housing, the elastic sealing cup having a curved circumferential flange to engage the circumferential groove, wherein the curved circumferential flange has a material accumulation in a region of the passage opening, said material accumulation being created by an increase of a thickness of the curved circumferential flange to a maximum thickness in said region of the passage opening for the valve shaft.

2. The clack valve of claim 1, wherein the increase of the curved thickness of the circumferential flange is constant.

* * * * *